United States Patent [19]

Lama

[11] 3,820,089

[45] June 25, 1974

[54] MAGNETIC BUBBLE DOMAIN DETECTION

[75] Inventor: Ugis Guntis Lama, Ottawa, Ontario, Canada

[73] Assignee: Bell Canada-Northern Electric Company Limited, Ottawa, Ontario, Canada

[22] Filed: Nov. 16, 1971

[21] Appl. No.: 199,199

[52] U.S. Cl.340/174 EB, 340/174 TF, 340/174 CA, 338/32 R

[51] Int. Cl. .......................................... G11c 11/14

[58] Field of Search.. 340/174 TF, 174 EB, 174 CA

[56] References Cited

OTHER PUBLICATIONS

IBM Technical Disclosure Bulletin, Vol. 14, No. 7, Dec. 1971, pg. 2,218–2,219.

IBM Technical Disclosure Bulletin, Vol. 13, No. 10, Mar. 1971, pg. 3,100–3,101.

*Primary Examiner*—James W. Moffitt
*Attorney, Agent, or Firm*—Sidney T. Jelly

[57] ABSTRACT

A magnetic bubble domain detector comprising two pairs of magnetoresistive elements connected to form a resistance bridge circuit. The pairs of elements are so arranged, electrically and geometrically that a magnetic bubble domain, in the detecting position, affects two elements simultaneously. The two elements are a pair and the elements are connected in electrical opposition but are positioned geometrically adjacent. This doubles the output from the bridge circuit when a bubble is at the detecting position. The arrangement of the elements of a pair also provides for the reduction of extraneous signals from domains in other positions, and for a reduction in the effect of the rotating field for propagating the domains.

4 Claims, 8 Drawing Figures

MAGNETIC BUBBLE DOMAIN DETECTION

This invention relates to magnetic bubble domain detection and is particularly concerned with improving the sensitivity of detecting means. In particular the invention relates to detection devices and to the method of making such devices.

Conventional means for detecting magnetic bubble domains, hereinafter referred to as magnetic bubbles, include a magnetoresistor — usually of a thin strip of material such as III–V semiconductor material or some ferromagnetic materials — through which is passed an electric current. When a magnetic field is applied transversely to the current in the plane of the field, as when a magnetic bubble passes below the strip, the resistance of the element changes by a few percent. This change is normally detected by using the magnetoresistor as one arm of a resistance-bridge circuit.

However such arrangements are not very sensitive. Also they can be affected by magnetic bubbles passing along adjacent paths, particularly when no magnetic bubble is passing beneath the element. The elements are also likely to be affected by the magnetic field for propagating the magnetic bubbles.

The present invention provides an arrangement whereby a plurality of magnetoresistor elements are used, each element a member of a common resistance-bridge circuit. The elements are relatively positioned so that when a magnetic bubble is in the detecting position it acts on two elements — providing a doubling of the output compared to a single element, and in other positions a magnetic bubble acts on the elements such as to create a balanced situation with no net change in the circuit. Various other advantages are obtained as will become evident in the following description.

The invention will be understood by the following description of various embodiments in conjunction with the accompanying drawings in which.

Figure 1:
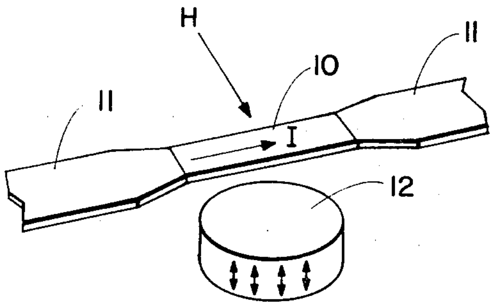
FIG. 1 is a diagrammatic illustration of a conventional magnetoresistor element.

FIG. 1 illustrates a typical, conventional, magnetoresistor 10, comprising a thin strip of III–V semiconductor, or other suitable material. One particular material is that known as Permalloy. An electric current is passed through the element 10, via leads 11, as indicated by the arrow I. If a magnetic field H is applied transversely to the current I, the current being in the plane of the magnetic field, the resistance of the element changes slightly — by a few percent. In the case of a thin film of Permalloy only the transverse component of the magnetic field will affect the resistance. In detecting a magnetic bubble 12, the magnetoresistor 10 responds to the radial magnetic field of the magnetic bubble produced by the magnetic field lines joining the inside with the outside of the magnetic bubble.

Figure 2:
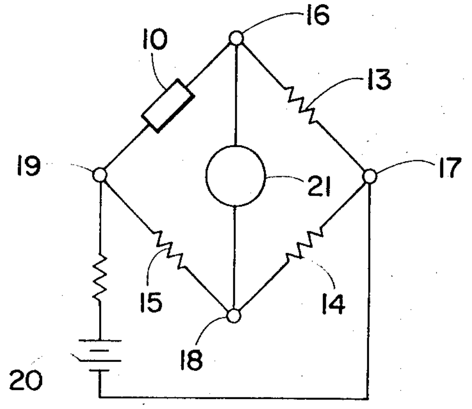
FIG. 2 is a typical resistance-bridge circuit.

FIG. 2 illustrates a resistance-bridge circuit, of conventional form, for detecting variations in the resistance of a magnetoresistor. The element 10 of FIG. 1 is indicated at 10 in FIG. 2. The bridge circuit is completed by three further resistors, 13, 14 and 15, of known resistance — the values usually being approximately equal. The resistors 13, 14 and 15 and the element 10 are connected at junctions 16, 17, 18 and 19 as shown. A constant current source 20 is connected across the circuit, for example by connection to junctions 17 and 19, and an indicator (or detector) 21 is connected across the circuit by connection to the remaining junctions 16 and 18. The indicator (or detector) 21 indicates any out of balance of the circuit which occurs as a result of a variation in the resistance of the element 10. The signal at the indicator 21 can be recorded or fed to some circuit or apparatus which will make use of such signal.

A particular use of a signal from the circuit of FIG. 2 is to indicate, record, or otherwise react to the resistance change of element 10 by the passage of a magnetic bubble over, or under, the element. However certain disadvantages arise with such a system. It is liable to produce signals when a magnetic bubble passes near to the element 10, such as when magnetic bubbles are propagated along paths which are adjacent to the path monitored by the element. The effective length of the element is limited by the size of bubbles monitored. Extraneous effects arise from in-plane rotating field used to propagate magnetic bubbles.

Figure 3:
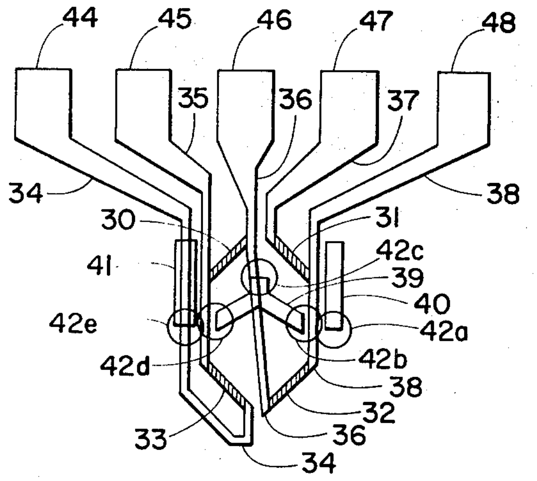

FIG. 3 illustrates an embodiment of the invention in which four magnetoresistor elements 30, 31, 32 and 33 are provided. The four elements, the four resistors of a resistance-bridge circuit, leads 34, 35, 36, 37 and 38 being provided for the interconnection of the elements and for the connection of a constant current supply and for the abstraction of an output for feeding to an indicator and/or detector. The embodiment is shown applied to a propagating path of the Y bar type, a Y indicated at 39 and bars at 40 and 41.

The elements 30, 31, 32 and 33 are inclined at 45° to the mean axis of the propagation path, and are also arranged in cooperating pairs which are electrically opposed and geometrically adjacent. Thus, as seen in FIG. 3, elements 30 and 31 form a cooperating pair, being so connected electrically as to be electrically opposed, while being geometrically adjacent. Elements 32 and 33 form a similar cooperating pair. The magnetic bubbles propagate along the path, under the influence of a rotating field — or by other means — progressively moving from the end of a bar to the one extremity of a Y arm, then to the base of the stem of the Y, then to the extremity of the other arm of the Y and then to the end of the next adjacent bar. The progression of a magnetic bubble is illustrated in FIG. 3, the various positions as described above indicated at 42*a*, 42*b*, 42*c*, 42*d* and 42*e* respectively.

The four elements 30, 31, 32 and 33 are interconnected to form a circuit as illustrated in FIG. 2, the elements forming the four resistors 10, 13, 14 and 15. Conveniently the elements are formed simultaneously on a substrate, as will be described later. To obtain an output from the circuit, elements 30 and 31 are connected to be electrically opposed, relative to the indicator, or detector 21 of the circuit in FIG. 2 as described above. This normally requires a cross-over connection. To avoid this, which would mean providing insulation between the two crossing leads, an additional lead is used — thus causing the five leads 34 through 38. Relating FIG. 3 to the circuit of FIG. 2, element 30 (FIG. 3) can be considered as corresponding to element 13 (FIG. 2), element 31 as element 15 (FIG. 2), element 32 as element 14 (FIG. 2) and element 33 as element 10 (FIG. 2).

The leads 34 through 38 are brought out to connection pads 44 through 48 respectively, and these pads correspond to the junctions in FIG. 2 as follows: pads 44 and 47 correspond to junction 19, pad 46 as junction 17, pad 48 as junction 18 and pad 45 as junction 16. An output signal abstracted from pads 45 and 48 and a constant current source is connected to pads 44 and 47 coupled together and to pad 46.

By arranging the elements of the bridge such that electrically opposed element are adjacent geometrically, a magnetic bubble can be made to act on two elements simultaneously, i.e., elements 30 and 31, when in the detecting position 42*c* on the end of the stem of Y 39. Thus there is an increased output as compared to a single emement in known devices. Furthermore, this arrangement improves immunity from unwanted fields by taking advantage of the following two properties.

A. The magnetoresistor element responds primarily only to the magnetic field component that is transverse to the current I.

B. The effect depends only on the direction of the magnetic field and not its sense.

Thus when the magnetic bubble is in any other position on the propagating track such as positions 42*b* or 42*d*, or 42*a* or 42*e*, the elements 31 and 32 are affected equally, and similarly, the elements 30 and 33 are affected equally, but more or less than 31 and 32. Since these pairs are on the same side of the bridge, the bridge remains in balance, so that no net change is observed in the output. Similarly, if there is any magnetic perturbation, because of the orthogonal arrangement and the close proximity of the elements the impinging magnetic field H passes through geometrically opposite elements at the same angle, and with similar strength for long-range or uniform fields, but with somewhat different strengths for localized perturbations. Therefore, since the geometrically opposite elements are electrically adjacent, any off-balance component is minimized. Thus the arrangement of the elements, as illustrated and described, increases the output when a magnetic bubble is in the detecting position and produces little or no output at other positions.

The magnetic bubbles do not pass under, or over, an element, when detected and therefore only a single unambiguous output signal is produced. Since the element is sensitive to the magnetic bubble edge field, two output signals can be produced when a magnetic bubble passes under, or over, a narrow sensitive element.

The rotating field which propagates the magnetic bubbles steps round in 90° steps. With the elements arranged at 45° to the main axis of the propagation path, the effect of the rotating field is minimized as the field will be acting at 45° to the axis of the elements at the time the output signal is produced by a magnetic bubble. Also as the elements are sequentially arranged, any effect on the elements does not affect the output signal as any effect by the rotating field is balanced within the resistance bridge.

Figure 4:
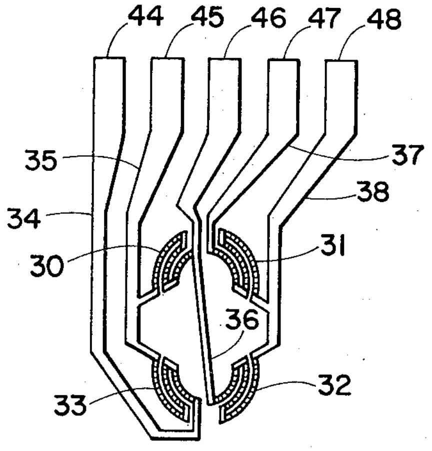
FIGS. 3 to 8 illustrate various embodiments of the invention having differing arrangements of magnetoresistor elements.

The length to width ratio can be increased by forming the resistors in a zig-zag or convolute formation. Such an arrangement is illustrated in FIG. 4. In this Figure the same reference numerals are used for details which are the same, or substantially the same as in FIG. 4. Thus, as seen, the elements 30, 31, 32 and 33 are each formed by three parallel sections joined in a zig-zag formation. The length to width ratio of each element is substantially increased.

Figure 5:
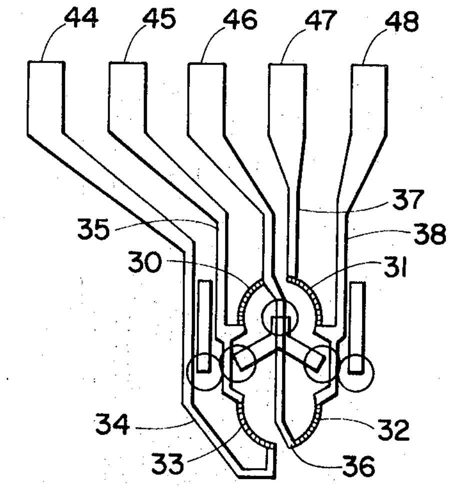

FIG. 4 also illustrates a further modification in that each element is curved. The centre of curvature is positioned at the centre of a magnetic bubble when positioned at the detecting position, that is on the end of the stem of the Y in a Y bar arrangement. This produces better coupling to the radial field of the magnetic bubble. It should be noted however that the mean direction of inclination is still at 45° to the mean axis of the propagation path. FIG. 5 illustrates a curved element arrangement for the single section form of elements as illustrated in FIG. 3.

Figure 6:
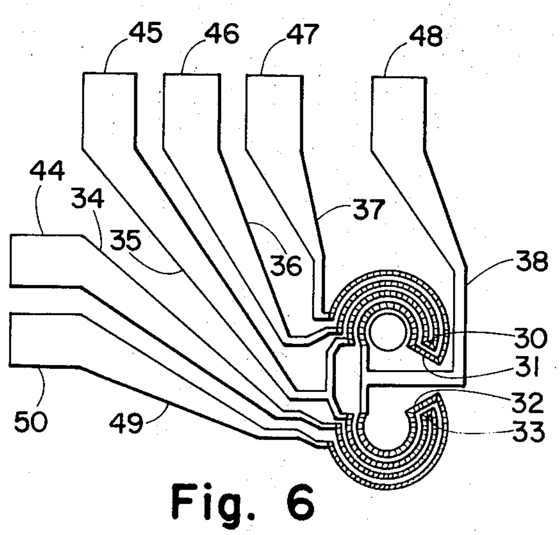

FIG. 6 illustrates yet a further arrangement of the resistor elements 30, 31, 32 and 33. The elements each comprise two parallel substantially semi-circular sections. The sections of one element of a pair are contained within the sections of the other element of the pair. Thus as seen in FIG. 6, the sections of element 30 are contained within the sections of element 31 and the sections of element 33 are contained within the sections of element 32. This provides a balanced arrangement. Although in this arrangement the elements are not at 45° to the propagation path, the effect of the rotating field is still cancelled out by the symmetrical arrangement of the elements. To avoid cross-overs, it is necessary to provide an additional lead. Lead 36 which connects to both element 30 and element 32 in the previous examples, only connects to element 30 in FIG. 6 and a further lead 49 connects one end of element 32 to a pad 50. Pads 46 and 50 are connected together by external circuitry in the same way as pads 44 and 47.

Figure 7:
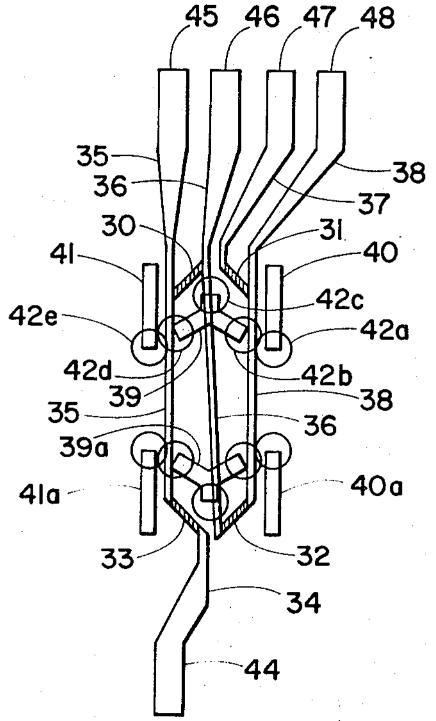
Figure 8:
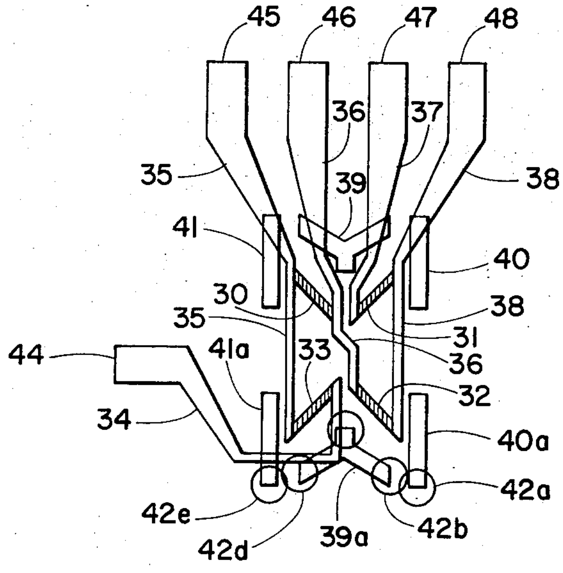

It is also possible to monitor two channels simultaneously, but at some slight loss in the insensitiveness to adjacent magnetic bubbles. To monitor two channels the resistance bridge is in effect separated into two halves, as seen in FIGS. 7 and 8. FIG. 7 shows the bridge arranged with one pair of resistor elements 30 and 31 monitoring one path — comprising Y 39 and I's 40 and 41, the other pair of elements 32 and 33, monitoring another path — comprising Y 39*a* and I's 40*a* and 41*a*. A similar arrangement exists in FIG. 8, the major difference between FIGS. 7 and 8 being that the resistance elements are arranged outside the paths of propagation in FIG. 7, while being positioned between the paths in FIG. 8.

Manufacture of the device is very simple, particularly when cross-over connections are avoided. A method of manufacture is as follows. A thin film, of magnetoresistive material, is evaporated onto a non-conducting substrate. A typical thickness is approximately 200A. A material manufactured under the trade mark Permalloy is one such material, but there are other suitable materials — well known. A second thin film, of conducting material, is evaporated onto the first film. A suitable material is gold and a typical thickness is approximately 300A. The entire pattern, comprising the resistor member and leads, is then etched out through both magnetoresistive conducting layers. The conducting layer is then etched away from those areas of the pattern where the detector is to be sensitive, that is the four resistor members 30, 31, 32 and 33.

The method has several advantages. There is no misalignment between contacts and the magnetoresistive elements as in a multimask process. The edges or ends of the magnetoresistive elements can be straight and well defined, without rounding of corners, since the mask used for the etching of the conductor layer can extend beyond the pattern since the pattern is already defined. The magnetoresistive material serves as the resistor elements and also as a bonding layer between the substrate and the conductor layer.

Simultaneous formation of all four elements of the resistance-bridge in a small area provides for very close tolerances, increased reliability and temperature stability. The simplicity of the process provides for ready formation of resistance bridge arrays, minimizing the number of external interconnections.

At the expense of some reduction in simplicity, the number of pads can be reduced by producing one or more cross-overs. Thus in the example of FIG. 3, lead 34 and pad 44 can be obviated if a connection is made between the corresponding ends of elements 33 and 31. This can be done by evaporating or otherwise forming an insulating layer over the lead 36 extending between elements 30 and 32. A further layer of conductor material is then formed to connect the end of element 33, remote from its end connected to lead 35, to the end of element 31 remote from its connection to lead 38. However this extra complication in the process is not normally worthwhile, unless space requirements make it desirable or necessary. Similar cross-overs can be provided for the arrangements of FIGS. 4, 5, 7 and 8 and two cross-over connections can be provided for the arrangement of FIG. 7.

What is claimed is:

1. Apparatus for detecting a magnetic bubble domain at a position in a propagating path, comprising:

a resistance-bridge circuit at said position, the circuit comprising four magnetoresistive elements, the elements connected in two cooperating pairs, the elements of a pair connected in electrical opposition and positioned geometrically adjacent, said pairs positioned one on each side of said propagating path and also symmetrically about and one on each side of an axis extending parallel to and offset from said propagating path; means for connecting a constant current source across said circuit; and means for abstracting an output from said circuit.

2. Apparatus as claimed in claim 1, the elements inclined to the magnetic bubble domain propagation path and spaced symmetrically about the said path, the elements of each cooperating pair parallel to each other, the elements of one cooperating pair of opposite inclination to the elements of the other cooperating pair.

3. Apparatus as claimed in claim 1, the elements each of arcuate formation, the centre of the arc coincident with the axis of a magnetic bubble domain in the detecting position.

4. Apparatus as claimed in claim 1, the elements each of convolute form.

* * * * *